United States Patent

[11] 3,621,955

| [72] | Inventors | James B. Black<br>Roscoe;<br>Robert W. Meyer, Pecatonica, both of Ill. |
|---|---|---|
| [21] | Appl. No. | 708 |
| [22] | Filed | Jan. 5, 1970 |
| [45] | Patented | Nov. 23, 1971 |
| [73] | Assignee | Twin Disc Incorporated<br>Racine, Wis. |

[54] TORQUE LIMITING CLUTCH FOR TORQUE CONVERTER CONTROLLED BY SPEED AND TRANSMISSION SELECTOR
3 Claims, 3 Drawing Figs.

| [52] | U.S. Cl. | 192/3.57, 74/733, 192/3.33, 192/103 F, 192/109 F |
|---|---|---|
| [51] | Int. Cl. | B60k 21/04, F16d 39/00 |
| [50] | Field of Search | 74/733; 192/56 F, 3.33, 3.57 |

[56] References Cited
UNITED STATES PATENTS

| 3,101,012 | 8/1963 | Christenson et al. | 192/56 F X |
|---|---|---|---|
| 3,242,770 | 3/1966 | Doversberger et al. | 74/733 |
| 3,447,397 | 6/1969 | Black et al. | 192/56 F X |
| 3,469,663 | 9/1969 | Hilpert et al. | 192/3.33 |

Primary Examiner—Benjamin W. Wyche
Attorney—James E. Nilles

ABSTRACT: A power transmission including a hydrodynamic torque converter and a modulated clutch, having a hydraulic control system for limiting the amount of torque which is capable of being applied to the wheels of a vehicle or the like. The control system includes an output driven pump which produces a signal flow proportional to its speed, and this signal is conducted to a variable orifice torque limiter valve. The torque limiter valve in turn controls the available fluid pressure which is conducted to the modulatable clutch, which clutch in turn determines the power output. Thus the output speed of the transmission is "read" and through a control system the output speed is controlled to limit the output torque.

Inventors:
James B. Black
Robert W. Meyer
By: James E. Nilles
Attorney

3,621,955

TORQUE LIMITING CLUTCH FOR TORQUE CONVERTER CONTROLLED BY SPEED AND TRANSMISSION SELECTOR

BACKGROUND OF THE INVENTION

Prior art power transmissions utilize a hydrodynamic torque converter in combination with a slippable friction clutch, the clutch in turn being modulated or made to slip in varying degrees by means of a control mechanism which regulates the flow of pressure fluid to the actuating chamber of the clutch. Such transmissions are shown in the U.S. Pat. No. 3,469,663 to Hilpert et. al., issued Sept. 30, 1969, entitled "Constant Speed Clutch and Torque Converter Transmission," or U.S. Pat. No. 3,352,395 to Hilpert, issued Nov. 14, 1967 and entitled "Friction Clutch Having Centrifugally Operated Valve Means."

These patents generally show a modulated clutch ahead of the hydrodynamic torque converter for applying variable power to the wheels of a vehicle. When power is required for other accessories of the vehicle, such as the bucket, the modulated clutch can be slipped to unload the tractive power of the vehicle.

When such transmissions are used in wheeled vehicles, particularly vehicles having rubber tires, it is desirable to be able to limit the amount of torque which the transmission is capable of applying to the wheels, to thereby reduce the damage to the rubber tires which otherwise occurs due to their continual slipping in the hard abrasive ground, for example on rocks.

SUMMARY OF THE INVENTION

The present invention provides a transmission including a torque converter and modulated clutch therefor, and also a fluid power control system in which the torque delivery by the transmission can be limited to a predetermined value. More specifically, the control system includes a fluid pump which is driven by the output shaft of the transmission, and which pump delivers a signal flow to a variable orifice torque limiting valve. The torque limiting valve can be preset to provide a predetermined maximum fluid pressure for the system.

The present invention provides a control system for such a transmission in which the full output torque capability of the transmission is possible up to the point of maximum torque which is desired to be delivered. The system is manually adjustable to permit the operator to be able to determine the amount of power desired and then be able to set the automatic control to prevent further slippage.

These and other objects and advantages of the present invention will appear hereinafter as this disclosure progresses, reference being made to the accompanying drawings.

DESCRIPTION OF A PREFERRED EMBODIMENT

Figure 1:
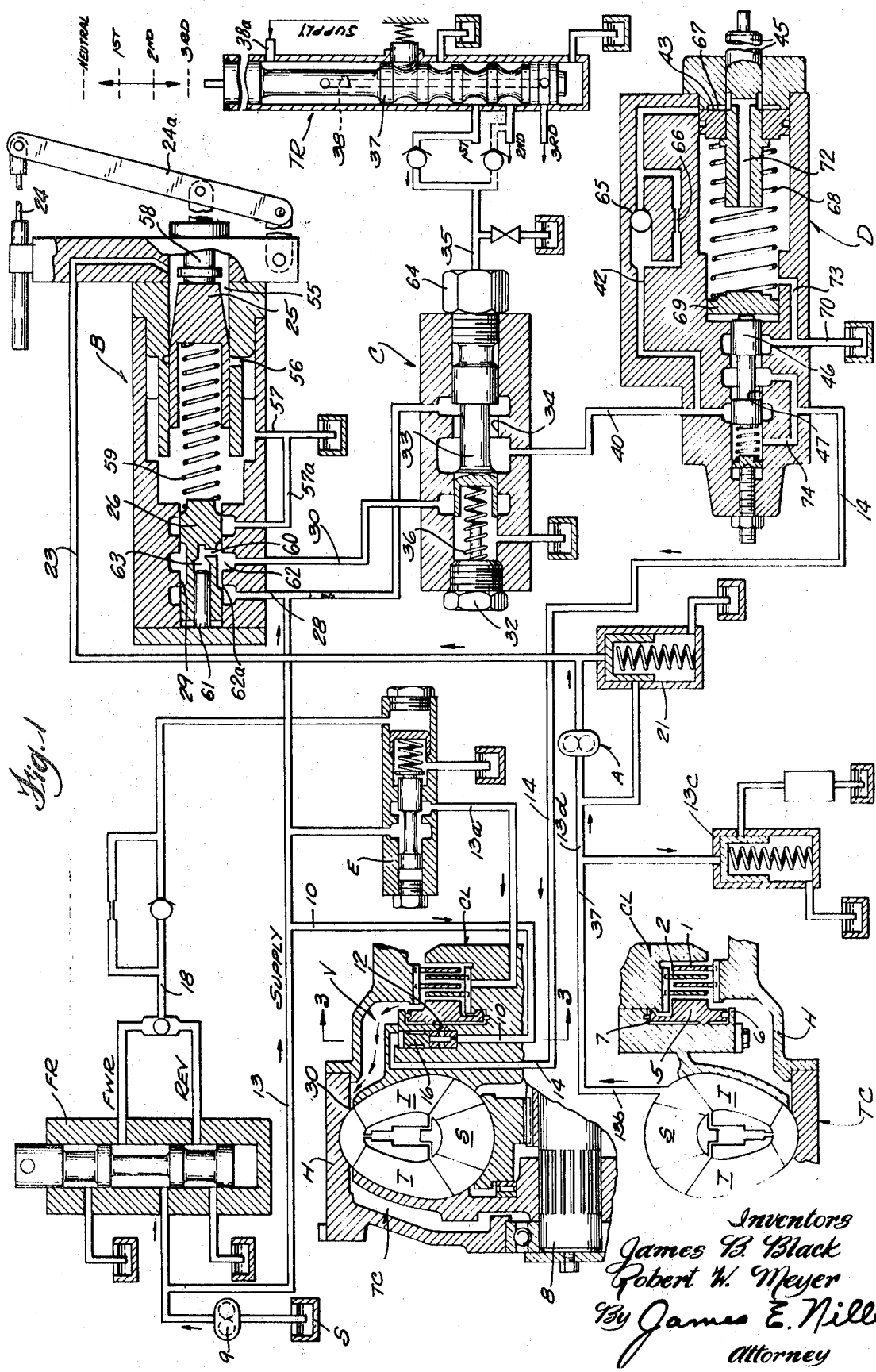
FIG. 1 is a hydraulic circuit of a control system made in accordance with the present invention.

The transmission includes a hydrodynamic torque converter TC which has a rotating housing H and is of the single stage type, and an internal modulated clutch CL is located between the engine driven housing H and the impeller I of the torque converter. This clutch is of the slippable, friction plate type in which interleaved friction plates 1 and 2 are axially splined, respectively, to the housing H and the hub 4, which hub is in turn secured to the impeller I. A clutch actuating piston 5 located in the clutch cylinder 6 is forced toward the clutch plates when the clutch actuating chamber 7 is pressurized with fluid in the known manner. When the interleaved clutch plates are clamped firmly together, the power is transmitted from the housing H and to the impeller I of the torque converter.

The torque converter is fed with high pressure fluid from line 13 through a regulating valve E and then through line 13a from which the fluid passes through the clutch plates 1 and 2 and then proceeds along a path in the clutch housing as indicated by the curvilinear arrows to a point 30 where it enters the toroidal path of the torque converter. The housing H in FIG. 1 has been shown for clarity as being broken away, but as is conventional, it would extend around and enclose the clutch CL. The fluid exits from the torque converter via conduit 13b which conducts the fluid to the torque converter pressure regulator 13c. Fluid is also then conducted via conduit 13d to an output driven fluid pump A for pressurizing the pump. The torque converter thereby transmits the power from impeller I and through the turbine member T which is splined to the output shaft 8.

Regulating valve E is shown and described in detail in the copending U.S. application, Ser. No. 550, filed Jan. 5, 1970, and entitled "A Torque Converter Power Transmission having Regulating Valve Means." As this valve E, per se, forms no part of the present invention, it is believed sufficient to merely say that its function is to maintain a minimum pressure in the clutch during direction shifts of the transmission so as to prevent the impeller of the torque converter from rotating backwards.

Figure 3:
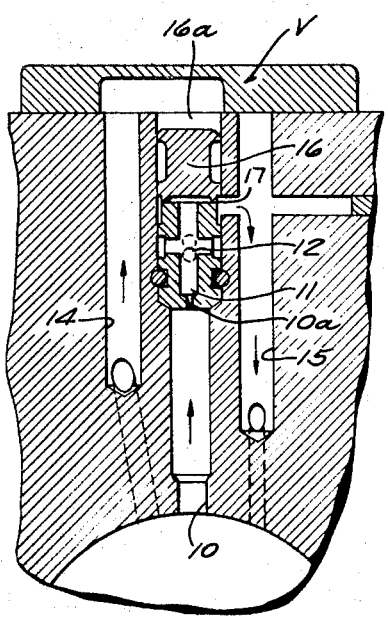
FIG. 3 is a cross-sectional view taken along line 3—3 in FIG. 1, but on an enlarged scale.

The clutch is of the modulatable type, and is controlled as to its amount of slipping, by means of the valve control mechanism V which serves to control the amount of pressure fluid being admitted from passage 10 to the clutch actuating chamber 7. More specifically for the purpose of actuating the clutch CL, high pressure fluid is supplied from a fluid pressure source 9, such as a fluid pump, and via conduit means 13 and 10, fixed orifice 10a, valve chamber 11, and cross port 12 where it enters the clutch actuating chamber 7. Control pressure fluid is also introduced from a modulating valve D, to be later described, and to the valve V through the passage means 14 to the radially outer end of a spool 16 which is radially shiftable in valve bore 16a. Control pressure in passage means 14 as determined by the modulating valve D, determines the value of piston pressure in chamber 7 and thereby torque capacity of the clutch. A dump passage 15 (FIG. 3) to sump is also provided.

Control pressure enters the control valve V at the outer end of the spool 16 and this control pressure acting on the radially outer end of the spool shifts it in an axial direction so as to control the amount of fluid being admitted from the passage 10 to the clutch actuating chamber 7. More specifically, the spool 16 forms a variable orifice at 17 (FIG. 3) to control the bleed off of the piston apply pressure to the sump. When control pressure in bore 16a is zero, spool 16 will move radially outward due to centrifugal force, permitting the pressure in clutch chamber 7 to be dumped to sump via opening 17 and passage 15. As control pressure in bore 16a is increased by the operator moving stem 45 of valve D (FIG. 1), inward or to the left, valve spool 16 is forced radially inward against centrifugal force and the flow from orifice 10a is metered off from the sump at face 17 causing the pressure in clutch chamber 7 to rise proportional to the control pressure increase. If a more complete description of the control valve V is deemed to be either necessary or desirable, reference may be had to the U.S. Pat. No. 3,352,395, issued Nov. 14, 1967. This valve and a generally similar transmission is also shown in the U.S. Pat. No. 3,469,333, issued Sept. 30, 1969. It is believed sufficient to say for purposes of this disclosure however, that the valve control V has a pressure which is set externally to give an impeller speed which is proportional to pressure, regardless of the coefficient of friction of the clutch plates, as taught in said U.S. Pat. No. 3,469,333. The power is thus delivered through the housing H, through the modulatable clutch CL which is controlled by the valve V and then through the torque converter and out the output shaft 8.

An output shaft driven, positive displacement pump A is located in the fluid circuit, as shown in FIG. 1, and is driven at the output end of the transmission, for example, as being driven by output shaft 8. A bypass regulator 21 is also located adjacent the pump and in the fluid circuit and this pump and bypass regulator act to send a signal flow of fluid which is proportional to its speed. This signal is sent via passage 23 to a variable orifice, torque limiter valve B.

As will more fully appear, the valve B can be preset to give the minimum amount of pressure desired, and this setting is made by adjusting the mechanical linkage 24 which determines the position of the lever. The action of the valve B is such that when the pump A begins to turn, the flow through slots 55 increases from zero, and the pressure increases at the right end of stem 25. This pressure increase forces the valve stem 25 to the left (as viewed in FIG. 1) thereby shifting spool 26 to the left and increasing the pressure in line 30 which is admitted to valves C and D, as will appear momentarily.

The valve B also includes the shiftable spool 26 which is spring biased to the left (FIG. 1). The farther the spool 26 moves to the left (FIG. 1), the higher will be the pressure which it permits to pass to the valve C, via line 30 and consequently to the clutch CL. Pressure from the main pressure line 13 is introduced via passage 28 to the bore 29 that contains the spool 26. This high pressure fluid supply is then metered through the valve B and out passage 30 where it enters the speed range selecting valve C. The valve C functions to permit the signal to go through to valve D from valve B.

Stated otherwise, the operation of valve B is as follows. Flow from pump A passes through conduit 23 to torque limiter valve B, through tapered slots 55, through vent hole 56 to the sump via 57. Pump A driven by the output shaft of the torque converter, which is also driving the wheels of the vehicle, delivers flow to valve B proportional to speed.

Bias spring 59 had initially forced spool 26 to the left, allowing main supply pressure from conduit 13 to enter chamber r.p.m., by a land opening at 62a. Supply pressure entered force pin cavity 63 via orifice 60. Pressure against force pin 61 pushed the valve 26 to the right against spring 59, setting a minimum pressure at no flow from pump A. A predetermined minimum pressure can be set in line 30 by the operator by means of levers 24 and 24a, forcing rod 58 against the end of spool 25. The differential pressure across the variable orifice 56 and, slots 55, force spool 25 to the left against the spring 59, which in turn forces spool 26 to the left allowing an increasing pressure in conduit 30, leading to range selecting valve C. Conduit 57a leads from valve B to the sump. Pressure in conduit 30 is a combination of metered entrance of high pressure fluid from conduit 28 and metered exit to the sump at 57a. When the output shaft and pump A are running above a prescribed r.p.m., the pressure across the slots 55 will force the pressure in conduit 30 to maximum. As the r.p.m. drops below the prescribed torque limiting r.p.m., the valve 25 will move to the right, reducing the available pressure at conduit 30 which is allowed by valve C, to enter valve D.

Valve C determines which transmission speed range in which the valve B will be used. The torque limiting feature is usually needed only in low gear, but may be used in other gear ranges also, and valve C, depending on the signal sent to it, will determine which speed range in which the valve B will work. A spring 36 biases the spool 33 located in bore 34 of valve C. Pressure fluid from a transmission range selector valve TR enters the end of valve C via passage 35 and acts on the end of the spool 33 opposite to the bias of the spring 36 of the valve. This pressure fluid entering conduit 35 acts to push the valve spool against the action of spring 36 and thereby places the valve C in the system. Pressure from the transmission range selector valve TR must be sufficient to move the valve or conversely the spring must be weak enough to be overcome by pressure available from transmission range selector valve TR.

More specifically, main supply pressure from valve TR when in first or second range, enters valve C through conduit 35 and fitting 64 acting on the end of spool 33, forcing the spool to the left against bias spring 36. With no pressure at conduit 35, the spool 33 is forced to the right allowing full main pressure oil to pass through valve C to valve D. When pressure is applied at conduit 35, the spool 33 is forced to the left, closing off the main pressure and allowing the output pump controlled pressure from valve B to pass to valve D. This gives range selective torque limiting.

As mentioned, valve C determines the speed range in which the torque limiter valve B will be operative, and as long as a pressure signal is introduced through conduit 35 from the transmission range selector valve TR, the speed range selecting valve C will connect valve B to valve D to permit limitation of pressure. Without pressure in line 35, the main line pressure will flow from line 13, through valve C to valve D. The operator thus has full pressure available in valve D to be metered to line 14 to the clutch valve V. The range selector valve TR has a spool 37 with an axial passage 38 for conducting main pressure fluid from pump 9 (via conduit 38a) to either the first, second or third speed range clutches (not shown).

In this manner, valve C is a speed range selecting valve for valve B, that is to say, if valve C receives a pressure signal through line 35, it will permit valve B to control the pressure available in line 40 leading to valve D.

Valve D is a manually controlled valve, for example, either operated by the foot or hand of the operator. This valve is thus manually set and regulates the flow of pressure in the system from the line 40 coming from the valve C and out the line 14 which is the control pressure line for the valve V. Thus, the modulating valve D can be set so the pressure of the modulated clutch can be set from zero to the maximum amount of available pressure.

The valve D also includes a bypass passage 42 which leads from the passage 40 and back to a chamber 43 and this bypass pressure acts as a power assist for the manually controlled valve stem 45.

The action of the valve D is to meter the fluid from passage 40 and through the spool 46 in bore 47 and then out the passage 14 to the valve V of the clutch CL. As mentioned, the valve D is thus operated by hand or foot and permits the operator to select any output pressure from zero up to the maximum permitted by the torque limiter valve V.

More specifically, valve D operates as follows. Either main pressure or a reduced pressure from the limiter valve B enters valve D via valve C and conduit 40. Main pressure or limited pressure also enters chamber 67 behind the spring force piston 43 via orifice 66. Orifice 66 and check valve 65 are not essential to this invention and could be replaced with an open drilled passage from conduit 40 to chamber 67.

Pressure in chamber 67 forces piston 43 to the left, compressing spring 68 which in turn forces piston 69 against the end of regulating spool 46. Spool 46 meters main pressure or limited pressure cross land 47 to clutch control via conduit 14. Metered clutch control pressure also feeds the left end of spool 46 via conduit 74 enabling the spool to be a pressure regulator for fluid in conduit 14, and at the same time, meters off the drain to sump via conduit 70. The operator by hand or foot, forces stem 45 inward to the left to increase clutch control pressure and outward to reduce control pressure in conduit 14.

Figure 2:
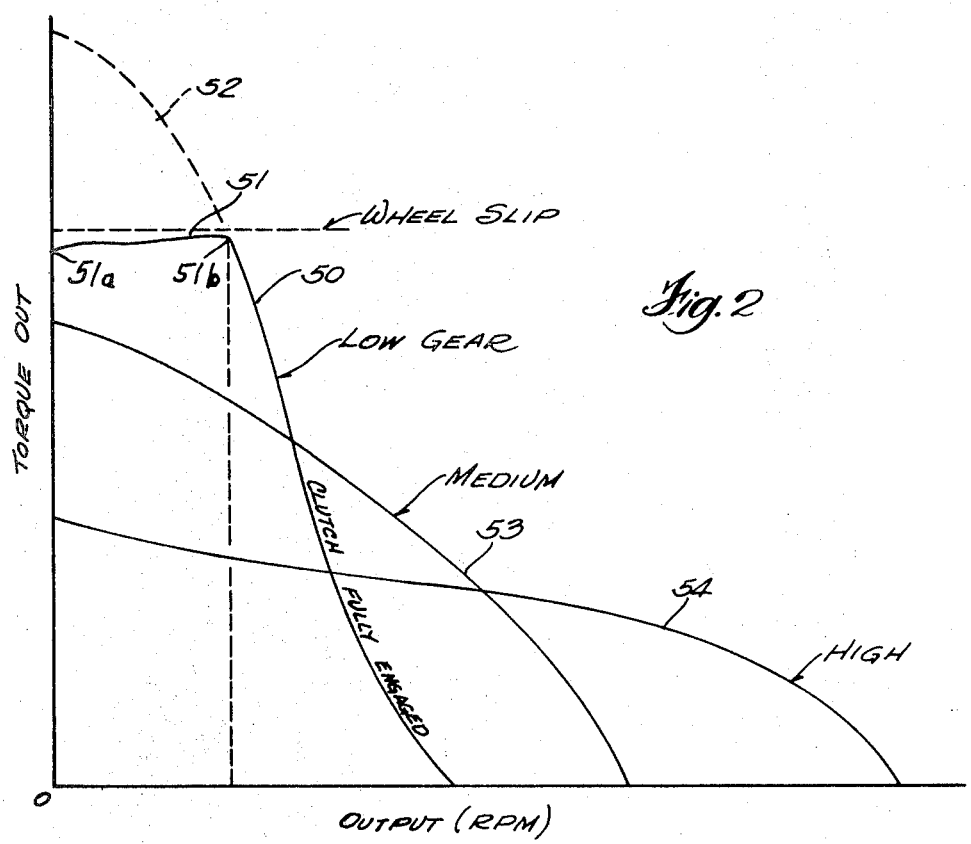
FIG. 2 is a graph showing torque plotted against output r.p.m. of the transmission and illustrating a typical output curve.

The chart shown in FIG. 2 shows a typical three speed bucket loader output curve and in which the torque output is plotted against the output speed of the vehicle. The curve portion 50, for a low gear operation, illustrates the characteristic of a modulated clutch fully engaged. Portion 51 of the curve illustrates the partial engagement of the clutch. The vertical distance illustrated by the dotted portion 52 of the curve illustrates the portion of the torque output during which the pump provides its signal. Curve 53 is a characteristic curve for a medium or second gear operation and curve 54 is for a high speed operation.

The curve portion 50 illustrates the output torques of the torque converter vs. output r.p.m. with a modulated clutch fully engaged at full main supply pressure in conduit 14. Spool 25 in valve B has been forced to the left due to flow through orifice slots 55. At point 51b the flow is just enough to maintain full control pressure on the clutch. As the wheels slow down further, the flow from pump A decreases and the spool 25 moves to the right. Control spool 26 moves to the right, orificing off the main pressure at land 29 reducing pressure in conduit 30 and 14, even though the operator is still calling for full clutch pressure.

The present invention is a combination of a ground speed sensitive pump flow, a valve B which converts this variable flow to a clutch control pressure signal proportional to flow, and an operator control valve D which enables the operator to vary the clutch control pressure from zero or some desired minimum pressure to the maximum pressure allowed by the limiter valve B and a fully modulatable clutch between the engine or prime mover and a hydrodynamic torque converter. In addition to this, the torque limiting can be effective in any given gear desired by the addition of the speed range valve C.

Assume the transmission is in first gear and the vehicle is stalled, and the operator is calling for full clutch pressure to move the load. Valve B has been set previously to give a maximum of 70 percent load for example, just under wheel slip, (51a in FIG. 2). As the vehicle starts to move, the pump A sends fluid flow via line 23 to valve B. As the flow increases with increasing speed, stem 25 forces regulator spool 26 to the left, permitting more and more of the main pressure in line 28 to be transmitted to line 30, and thence to valve D. At some speed and flow (say at 51b), the modulated clutch will be fully engaged as shown in FIG. 2 and pressure in conduit 40 will be 100 percent of available main. If medium or second gear will cause wheel slip, the limiter can be effective in second gear.

With the arrangement of the present invention, the operator can adjust for full torque capability, test the vehicle to determine that he has enough power to slip the wheels and then back off the torque limiter setting to protect his tires. This assures that he has full torque capability down to some low ground speed and is automatically protected below this point. If he had to use the engine throttle to perform the same function, he would have to let up after the wheel had signaled him by slipping. This would be too late to protect the tires.

RESUME

The present invention provides a transmission including a torque converter and a modulated clutch in which the torque to the wheels of a vehicle can be limited. The invention finds particular utility in reducing damage to rubber tires of a loading vehicle, for example, which damage occurs from continually slipping the tires on hard abrasive ground or rocks. The torque limiting control system of the present invention is capable of being set at various levels by the operator of the vehicle. The system is usually most effective in the lowest gear, but its use in other speed ranges is also possible. The system provides full output torque capability of the transmission up to the maximum level desired just short of the slipping point. The system is manually adjustable to permit the operator to be able to extend the slipout point to determine whether sufficient power is available, and then the operator can set the automatic control to prevent further slippage. The input torque depends on the input speed to an appreciable extent, particularly at low speed ratios when the output torque is the highest, and the output torque which drives the wheels is indirectly limited by slipping of the modulated clutch. Therefore, by limiting the control pressure below a given output speed, the torque can also be limited. Above some predetermined output speed, the torque limiting valve B can be wide open and thereby permit full main pressure to go to the modulating valve D. The modulating valve D is manually operated to permit the operator to select any desired output torque from zero up to the maximum amount which is permitted by the torque limiter.

We claim:

1. A power transmission having a torque converter and a hydraulically actuated modulatable clutch for controlling the operation of said converter, a control valve for controlling the pressure fluid admitted to said clutch, said transmission also having an output member; a hydraulic control system for limiting the output torque of said transmission and comprising,
   a hydraulic circuit for controlling the pressure fluid admitted to said control valve,
   a source of high pressure fluid in said circuit,
   a fluid pump in said circuit and driven from the output of said transmission,
   a variable orifice torque limiting valve in fluid receiving communication from said pump, said torque limiting valve also being in fluid receiving communication with said source of pressure,
   a speed range selecting valve in fluid receiving communication with said torque limiting valve and said source of fluid pressure, said speed range selecting valve acting to determine the transmission speed range in which said torque limiting valve will operate, a transmission range selector valve for providing a fluid signal to said speed range selector valve, and
   a manually operated modulating control valve in fluid receiving communication with said torque limiting valve via said speed range selector valve delivering pressure fluid to said clutch control valve to thereby control the amount of fluid pressure delivered to said clutch control valve.

2. A power transmission having a torque converter and a hydraulically actuated modulatable clutch for controlling the operation of said converter, a control valve for controlling the pressure fluid admitted to said clutch, said transmission also having an output member; a hydraulic control system for limiting the output torque of said transmission and comprising,
   a hydraulic circuit for controlling the pressure fluid admitted to said control valve,
   a source of high pressure fluid in said circuit,
   a fluid pump and regulator in said circuit, said pump being driven from the output of said transmission,
   a variable orifice torque limiting valve in fluid receiving communication from said pump, said torque limiting valve also being in fluid receiving communication with said source of pressure,
   a speed range selecting valve for and in fluid receiving communication with said torque limiting valve and said source of fluid pressure, a transmission range selector valve, said speed range selecting valve also being in fluid receiving communication with said transmission range selector valve, and
   a manually operated modulating control valve in fluid receiving communication with said torque limiting valve via said speed range selector valve and in a fluid delivering communication with said clutch control valve, whereby said torque limiting valve limits the amount of fluid pressure delivered to said modulating valve and said modulating valve controls the amount of fluid pressure delivered to said clutch control valve in accordance with the output speed of said transmission.

3. A hydraulic control system for limiting the output torque of a transmission having a torque converter, a hydraulically actuated modulatable clutch for controlling the operation of said converter, a control valve for controlling the pressure fluid admitted to said clutch, and an output member; said system comprising;
   a hydraulic circuit for controlling the pressure fluid admitted to said control valve,
   a source of high pressure fluid in said circuit,
   a fluid pump and regulator in said circuit, said pump being driven from the output of said transmission,
   a variable orifice torque limiting valve in fluid receiving communication from said pump, said torque limiting valve also being in fluid receiving communication with said source of pressure,
   a speed range selecting valve in fluid receiving communication with said torque limiting valve and said source of fluid pressure, a transmission range selector valve, said speed range selecting valve also being in fluid receiving communication with said transmission range selector valve, and a manually operated modulating control valve in fluid receiving communication with said torque limiting valve via said speed range selector valve and in a fluid delivering communication with said clutch control valve, whereby said torque limiting valve limits the amount of fluid pressure delivered to said modulating valve and said modulating valve controls the amount of fluid pressure delivered to said clutch control valve in accordance with the output speed of said transmission.

* * * * *